United States Patent
Nagao

(10) Patent No.: US 9,704,034 B2
(45) Date of Patent: Jul. 11, 2017

(54) IMAGE PROCESSING DEVICE, ELECTRONIC APPARATUS, AND GLASSES CHARACTERISTIC DETERMINATION METHOD

(71) Applicant: FUJITSU LIMITED, Kawasaki-shi, Kanagawa (JP)

(72) Inventor: Atsushi Nagao, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 267 days.

(21) Appl. No.: 14/312,516

(22) Filed: Jun. 23, 2014

(65) Prior Publication Data

US 2015/0029323 A1  Jan. 29, 2015

(30) Foreign Application Priority Data

Jul. 24, 2013 (JP) .................... 2013-153669

(51) Int. Cl.
*G06K 9/00* (2006.01)
*G01M 11/02* (2006.01)
(Continued)

(52) U.S. Cl.
CPC .......... *G06K 9/00604* (2013.01); *G01B 11/24* (2013.01); *G01M 11/0228* (2013.01); *G06K 9/0061* (2013.01); *G06T 3/40* (2013.01)

(58) Field of Classification Search
CPC .. G06K 9/00604; G06K 9/0061; G01B 11/24; G06T 3/40; G06T 3/00; G01M 11/0228; G06F 3/012; G06F 3/011; G06F 3/048; G09B 21/008; A61B 3/0041; A61B 3/04; G09G 5/14; G09G 3/003; G09G 2320/0693; G09G 2320/0626; G09G 2300/023; G09G 2380/08; H01F 7/13; G01N 21/958; G01N 21/896; G02C 7/027;
(Continued)

(56) References Cited

U.S. PATENT DOCUMENTS 3,792,930 A * 2/1974 Obenreder ........... G01N 21/896
356/128
6,692,127 B2 * 2/2004 Abitbol .............. G06Q 30/0641
345/419
(Continued)

FOREIGN PATENT DOCUMENTS

EP   1 901 564 A1   3/2008
EP   2 608 109 A1   6/2013
(Continued)

OTHER PUBLICATIONS

Extended European Search Report of European Patent Application No. 14173923.5 dated Dec. 10, 2014.

*Primary Examiner* — Dramos I Kalapodas
(74) *Attorney, Agent, or Firm* — Maschoff Brennan

(57) ABSTRACT

An image processing device includes a memory; and a processor coupled to the memory, configured to determine a characteristic of glasses based on a first contour position and a second contour position, the first contour position indicating a contour position of a face that appears without the glasses and being detected from an obtained face image data of a user, and the second contour position indicating a contour position of the face that appears through the glasses and being detected from the obtained face image data of the user.

11 Claims, 12 Drawing Sheets

(51) Int. Cl.
*G01B 11/24* (2006.01)
*G06T 3/40* (2006.01)

(58) Field of Classification Search
CPC .... G02C 7/086; G02C 13/005; G02C 13/003;
G02C 7/021; G02B 2027/0178; G02B
27/0012; G02B 27/0172; G02B 7/086
See application file for complete search history.

(56) References Cited

U.S. PATENT DOCUMENTS

| | | | | |
|---|---|---|---|---|
| 7,152,976 | B2 * | 12/2006 | Fukuma | G02C 13/005 351/227 |
| 7,322,697 | B2 * | 1/2008 | Jojiki | A61B 3/111 351/200 |
| 7,370,970 | B2 * | 5/2008 | Hammoud | G06K 9/00604 351/222 |
| 7,517,086 | B1 * | 4/2009 | Kurkure | G09B 21/008 351/246 |
| 8,305,433 | B2 * | 11/2012 | Alberth | G06F 3/011 348/77 |
| 2004/0179716 | A1 * | 9/2004 | Tafuku | G06K 9/00604 382/103 |
| 2005/0068495 | A1 * | 3/2005 | Jojiki | A61B 3/111 351/204 |
| 2005/0162512 | A1 * | 7/2005 | Seakins | G09B 21/00 348/62 |
| 2006/0165265 | A1 * | 7/2006 | Fujimatsu | G06K 9/00604 382/117 |
| 2011/0157180 | A1 * | 6/2011 | Burger | G06T 3/00 345/428 |
| 2012/0081661 | A1 * | 4/2012 | Yamakaji | G01M 11/0257 351/159.76 |
| 2013/0093796 | A1 * | 4/2013 | Lee | G09G 3/003 345/690 |
| 2013/0155393 | A1 * | 6/2013 | Blonde | G01M 11/0228 356/125 |
| 2013/0179297 | A1 * | 7/2013 | Yamakaji | G02C 7/025 705/26.5 |
| 2013/0235367 | A1 * | 9/2013 | Sekiguchi | G01N 21/41 356/51 |
| 2015/0374224 | A1 * | 12/2015 | Baranton | A61B 3/0091 351/206 |

FOREIGN PATENT DOCUMENTS

| | | |
|---|---|---|
| JP | 10-260666 A | 9/1998 |
| JP | 2006-318374 A | 11/2006 |
| JP | 2007-010924 A | 1/2007 |
| JP | 2007-235582 A | 9/2007 |
| WO | 2011/156721 A1 | 12/2011 |

* cited by examiner

FIG. 6

| GLASSES CHARACTERISTIC | REFRACTION INDEX | BF | FG |
|---|---|---|---|
| FARSIGHTEDNESS | $\alpha 11$ | a11 | A11 |
| FARSIGHTEDNESS | $\alpha 12$ | a12 | A12 |
| NEARSIGHTEDNESS | $\alpha 21$ | a21 | A21 |
| NEARSIGHTEDNESS | $\alpha 22$ | a22 | A22 |

FIG. 7

| USER IDENTIFICATION INFORMATION | GLASSES CHARACTERISTIC | FARSIGHTEDNESS |
|---|---|---|
| aaa | FARSIGHTEDNESS | 1.2 TIMES |
| bbb | FARSIGHTEDNESS | 1.3 TIMES |
| ccc | NEARSIGHTEDNESS | 1.2 TIMES |
| ddd | NEARSIGHTEDNESS | 1.4 TIMES |

IMAGE PROCESSING DEVICE, ELECTRONIC APPARATUS, AND GLASSES CHARACTERISTIC DETERMINATION METHOD

CROSS-REFERENCE TO RELATED APPLICATION

This application is based upon and claims the benefit of priority of the prior Japanese Patent Application No. 2013-153669, filed on Jul. 24, 2013, the entire contents of which are incorporated herein by reference.

FIELD

The embodiments discussed herein are related to an image processing device, electronic apparatus, and a glasses characteristic determination method.

BACKGROUND

Electronic apparatus such as a computer, a mobile phone terminal, a portable information terminal, and a tablet terminal displays information to a user with characters and images on its display screen. In particular, with high performance and multiple functions of such portable information terminals, an amount of information displayed with characters and images on the display screen of the portable information terminal has been increased. However, since the size of the display screen mounted on the portable information terminal is limited, the characters and the images to be displayed become small when a lot of information is displayed with characters and images on the display screen. When it is difficult for the user to read the small character, it is desirable that an operation to change a display scaling factor of the character and the image is performed.

The states of eyes of users include nearsightedness, farsightedness, presbyopia, and the like. Therefore, a technique has been discussed by which the fatigue of eyes of user is reduced by registering the state of the eyes of the user beforehand and displaying characters and images in appropriate size corresponding to the registered eyes state (Japanese Laid-open Patent Publication No. 2007-10924). In addition, there is a technique by which it is detected whether or not a user wears glasses. The technique has been discussed in Japanese Laid-open Patent Publication No. 2006-318374.

SUMMARY

According to an aspect of the invention, an image processing device includes a memory; and a processor coupled to the memory, configured to determine a characteristic of glasses based on a first contour position and a second contour position, the first contour position indicating a contour position of a face that appears without the glasses and being detected from an obtained face image data of a user, and the second contour position indicating a contour position of the face that appears through the glasses and being detected from the obtained face image data of the user.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a table illustrating glasses characteristic determination information;

FIG. 7 is a table illustrating display screen magnification determination information;

DESCRIPTION OF EMBODIMENTS

In the electronic apparatus according to the related arts, it is desirable that the user inputs the state of user's eyes to the electronic apparatus, so that an additional effort is desired in such an input operation. In addition, appropriate display may not be performed unless input is performed again when there is a state such as a state in which the user wears glasses or a state in which the user does not wear glasses, which is different from the input eyes state.

In addition, there are various eyes states for users, and the user corrects the vision by wearing glasses having a characteristic that corresponds to the state of user's eyes such as nearsightedness, farsightedness, or presbyopia. It is difficult to determine a characteristic of glasses of the user to correct the vision merely using the technique by which it is determined whether or not the user wears glasses.

In particular, when an increase in the elderly people in the future is considered, it is desirable that a characteristic of glasses used by the user may be determined without causing the user to perform a complicated input operation.

In the embodiments discussed herein, there are provided an image processing device, electronic apparatus, a glasses characteristic determination method, and a glasses characteristic determination program by which a characteristic of the glasses of the user is determined.

The image processing device, the electronic apparatus, the glasses characteristic determination method, and the glasses characteristic determination program according to the embodiments are described in detail below with reference to drawings. The technique discussed herein is not limited to such examples.

(Portable Information Terminal on which an Image Processing Device is Mounted)

A portable information terminal 100 on which an image processing device according to a first embodiment is mounted is described below with reference to FIG. 1. In the embodiment, as the portable information terminal 100, for example, a smartphone, a tablet personal computer (PC), and the like may be employed.

Figure 1:
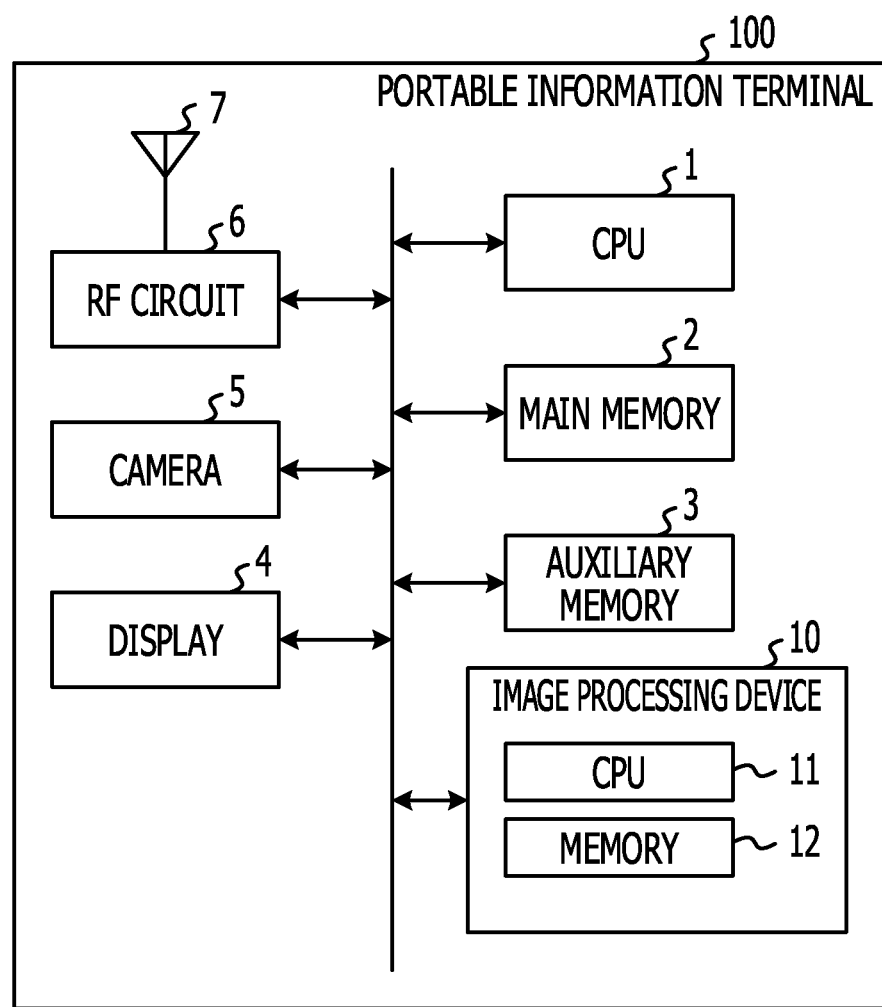
FIG. 1 is a schematic diagram illustrating a hardware structure of a portable information terminal.

FIG. 1 is a schematic diagram illustrating a hardware structure of the portable information terminal 100 according to the first embodiment. As illustrated in FIG. 1, the portable information terminal 100 includes, for example, a radio frequency (RF) circuit 6 that includes an antenna 7, a CPU 1, a main memory 2, an auxiliary memory 3, a display 4, a camera 5, and an image processing device 10, as a hardware structure element. The image processing device 10 includes a CPU 11 and a memory 12. These hardware modules are coupled to each other, for example, through a bus.

The main memory 2 stores various programs that are executed by the CPU 1. In addition, the main memory 2 is used as a work area of the CPU 1, and stores various pieces of data to be used for processing by the CPU 1. As the main memory 2, for example, a random access memory (RAM) or the like may be used. The auxiliary memory 3 stores various programs to be used to operate the portable information terminal 100. As the various programs, for example, there are an operation system (OS), an application program that is executed by the portable information terminal 100, and the like. The CPU 1 achieves various functions by reading the various programs stored in the main memory 2 or the auxiliary memory 3 and executing the various programs.

The display 4 is controlled by the CPU 1 so as to display screen information for the user. A touch screen is applied to the display 4, and performs input of information on a location that is touched through a finger tip of the user, a pen nib, or the like.

The memory 12 of the image processing device 10 stores the various programs to operate the image processing device 10. The CPU 11 of the image processing device 10 achieves various functions by reading the various programs stored in the memory 12 and executing the various programs. The details of the various functions are described later.

(Function Block of the Portable Information Terminal 100)

Figure 2:
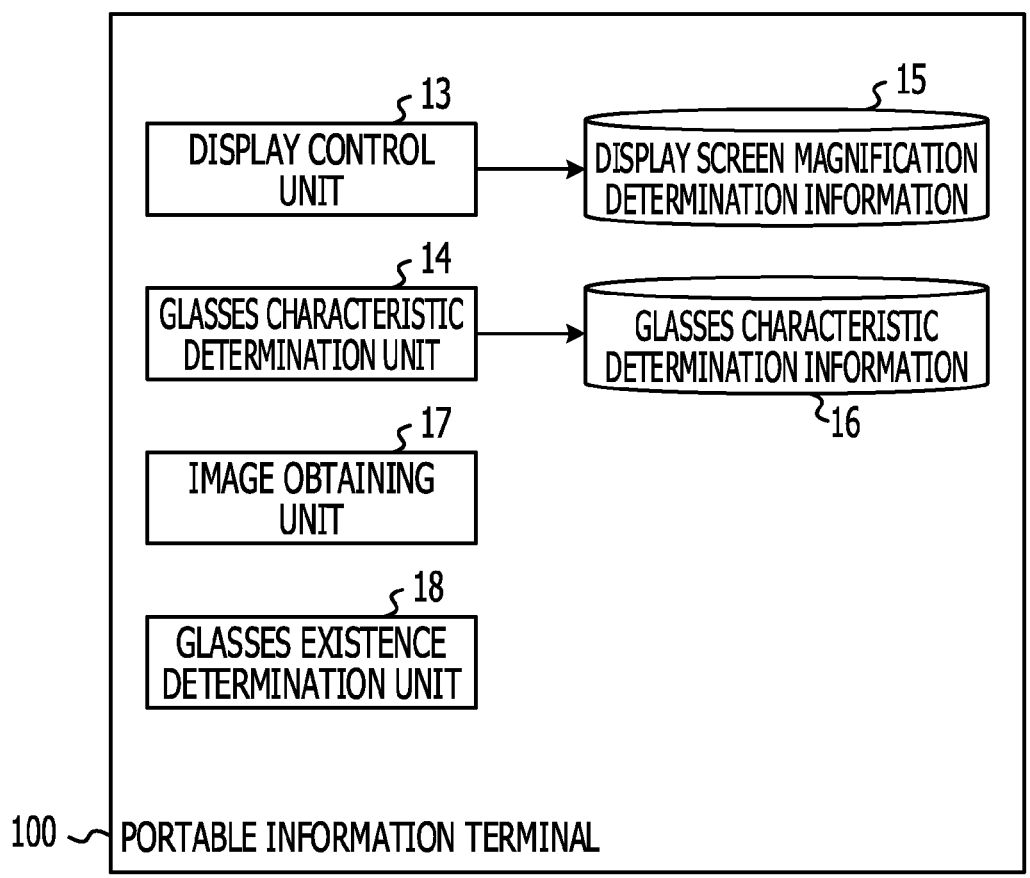
FIG. 2 is a schematic diagram illustrating a function block of the portable information terminal.

FIG. 2 is a schematic diagram illustrating a function block of the portable information terminal 100 according to the first embodiment.

As illustrated in FIG. 2, the portable information terminal 100 according to the embodiment includes a display control unit 13, a glasses characteristic determination unit 14, display screen magnification determination information 15, glasses characteristic determination information 16, an image obtaining unit 17, and a glasses existence determination unit 18. The display control unit 13, the glasses characteristic determination unit 14, the image obtaining unit 17, and the glasses existence determination unit 18 are obtained when the CPU 11 in FIG. 1 executes the various programs stored in the memory 12.

The display control unit 13 refers to the display screen magnification determination information 15, decides magnification of a character and an image that are displayed on the display 4, and displays the magnified character and image on the display screen. To the display screen magnification determination information 15, user identification information that is used to identify a user's face based on a feature of the user's face, magnification of a character and an image, which is associated with the user identification information, and a glasses characteristic that indicates whether glasses of the user are farsightedness glasses or nearsightedness glasses are registered. In glasses characteristic determination processing, which is described later, the user identification information, the magnification, and the glasses characteristic are registered to the display screen magnification determination information 15. Magnification depending on the size of a refraction index α of the glasses of the user is set beforehand.

The glasses characteristic determination unit 14 determines a characteristic of glasses of the user corresponds to farsightedness or nearsightedness, based on the glasses characteristic determination information 16 in which information on an image obtained by the image obtaining unit 17, a first contour position and a second contour position that are described later, a refraction index α of the glasses, and a characteristic of the glasses for farsightedness or nearsightedness are registered so as to be associated with each other. Here, the first contour position indicates a contour position of the face, which appears without the glasses. The second contour position indicates a contour position of the face, which appears through the glasses.

Information on the determined characteristic of the glasses is registered so that the display screen magnification determination information 15 is associated with identification information of the user and a display scaling factor of a character and an image. When the user's face is imaged, the glasses existence determination unit 18 determines the existence and the position of the glasses, and determines whether the image is an image through the glasses or an image without the glasses.

(Description of the Glasses Characteristic Determination Program)

A characteristic of the glasses is described below. As the glasses, there are glasses using a convex lens and glasses using a concave lens. The convex lens is a lens having a property in which light is refracted and focused at a relatively short distance. The convex lens is prescribed, for example, for farsightedness in which light is focused at the back of a retina, and is used for farsightedness glasses. In addition, the concave lens is a lens having a property in which light is diffused. The concave lens is used as lenses of nearsightedness glasses so that, for example, light that is converged at a crystalline lens is caused to reach a retina using the property.

Due to a difference between the convex lens and the concave lens, contour positions of a face that appears through the glasses and a face that appears without the glasses are different when the face of a person who wears glasses is seen from the front with a certain angle. For example, a contour position of the face, which appears through nearsightedness glasses appear to be closer to the center of the face than a contour position of the face, which appears without the nearsightedness glasses.

A glasses characteristic determination method is described below with reference to FIGS. 3, 4, and 5.

Figure 3:
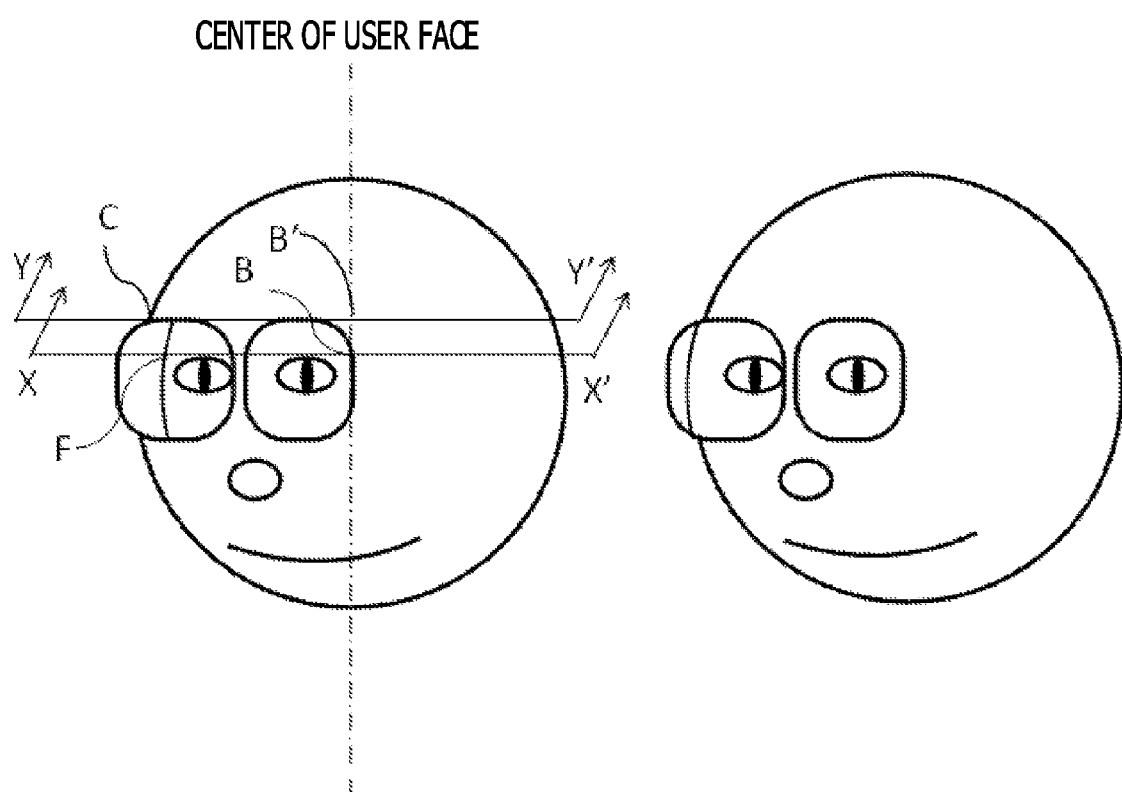
FIG. 3 is a diagram illustrating a relationship between a first contour position and a second contour position of an imaged user's face.
Figure 4:
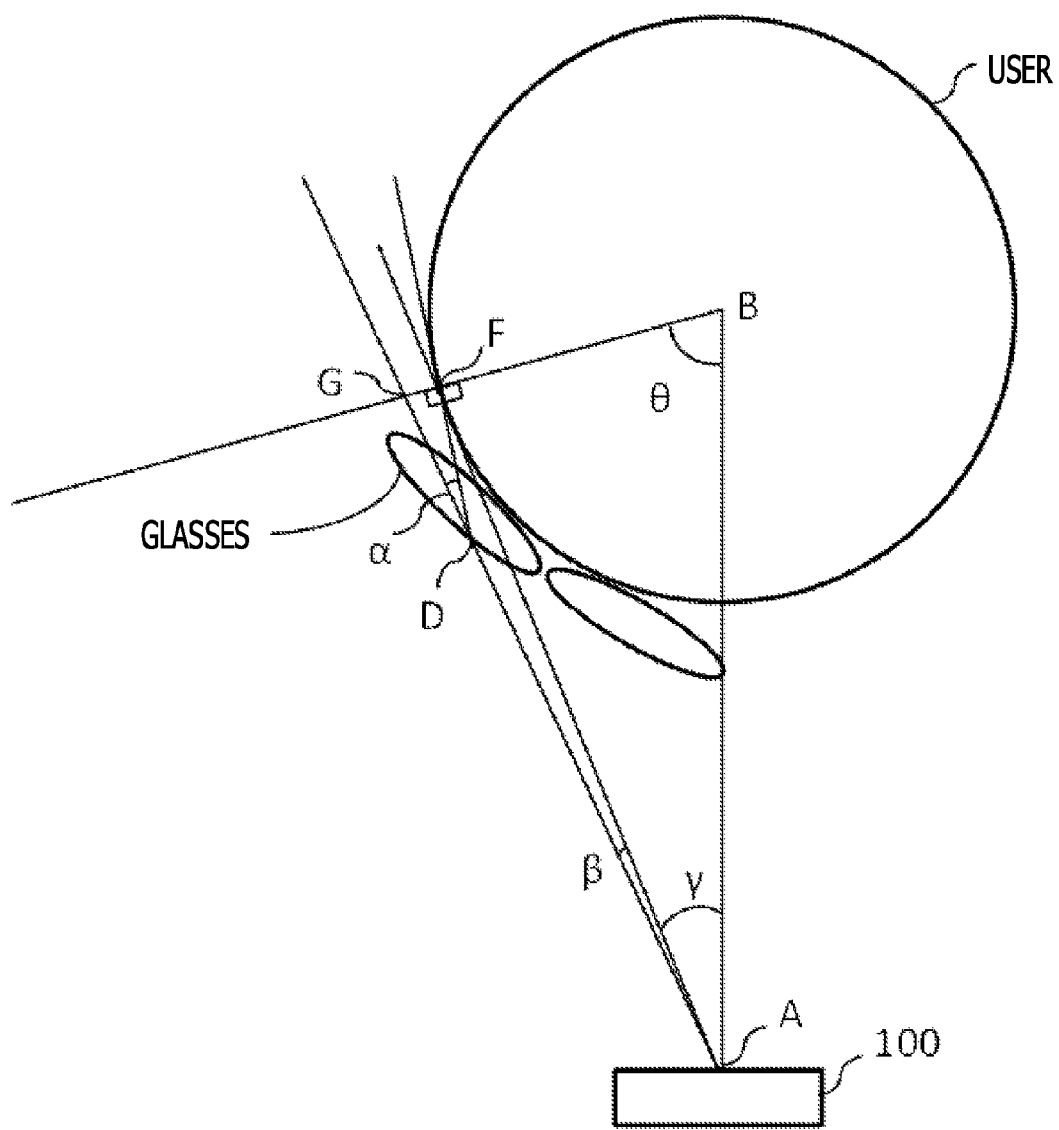
FIG. 4 is a cross-sectional view of an X-X' line in FIG. 3.

FIG. 3 is a front view of the user who wears glasses, in which the user's face is imaged from the front. FIG. 3 indicates a relationship a first contour position and a second contour position of the imaged user's face. The first contour position is a contour position C of the face that appears without the glasses, and the second contour position is a contour position F of the face that appears through the glasses. In FIG. 3, "B" is a point that passes through the center line of the user's face.

When the user wears nearsightedness glasses, that is, glasses having concave lenses, a contour position of the face, which appears through the nearsightedness glasses appears to be closer to the center of the face than a contour position of the face, which appears without the glasses. In addition, when the user wears farsightedness glasses, that is, glasses having convex lenses, a contour position of the face, which appears through the farsightedness glasses appears to be further from the center of the face than a contour position of the face, which appears without the glasses. That is, due to displacement between the first contour position and the second contour position, it is determined whether or not a characteristic of the glasses corresponds to the farsightedness glasses or the nearsightedness glasses.

A distance from the center position B of the user's face to the first contour position C is set as "BC", and a distance from the first contour position C to the second contour position F is set as "CF". A cross-sectional view taken along the X-X' line that includes the user's face illustrated in FIG. 3 and the camera 5 that is not illustrated is illustrated in FIG. 4. A cross-sectional view taken along the Y-Y' line that includes the user's face illustrated in FIG. 3 and the camera 5 that is not illustrated is illustrated in FIG. 5.

When a position of the camera 5, a position of the user's face, positions of the lenses of the glasses of the user are determined, a refraction index $\alpha$ for the glasses may be calculated. Description is made below using "A" to "G", and angles $\theta$, $\alpha$, $\beta$, and $\gamma$ illustrated in FIGS. 3 to 5. Here, "A" indicates the position of the camera 5. "B" indicates the center position of the cross section of the user's face. "D" indicates a refraction point on the lens from the camera position A to the contour position F (second contour position) of the face that appears through the glasses. "G" indicates an intersection of the straight line AD and the straight line BF. The angle $\theta$ is an angle between the straight line AB from the center position B of the user's face to the camera position A, and the straight line BF from the center position B of the user's face to the second contour position F. The angle $\alpha$ is a refraction angle to the second contour position F through the refraction point on the lens, and indicates the refraction index $\alpha$ of the lenses of the glasses of the user. The angle $\beta$ indicates an angle between the straight line AF and the straight line AD (straight line AG). The angle $\gamma$ indicates an angle between the straight line AB and the straight line AF.

Figure 5:
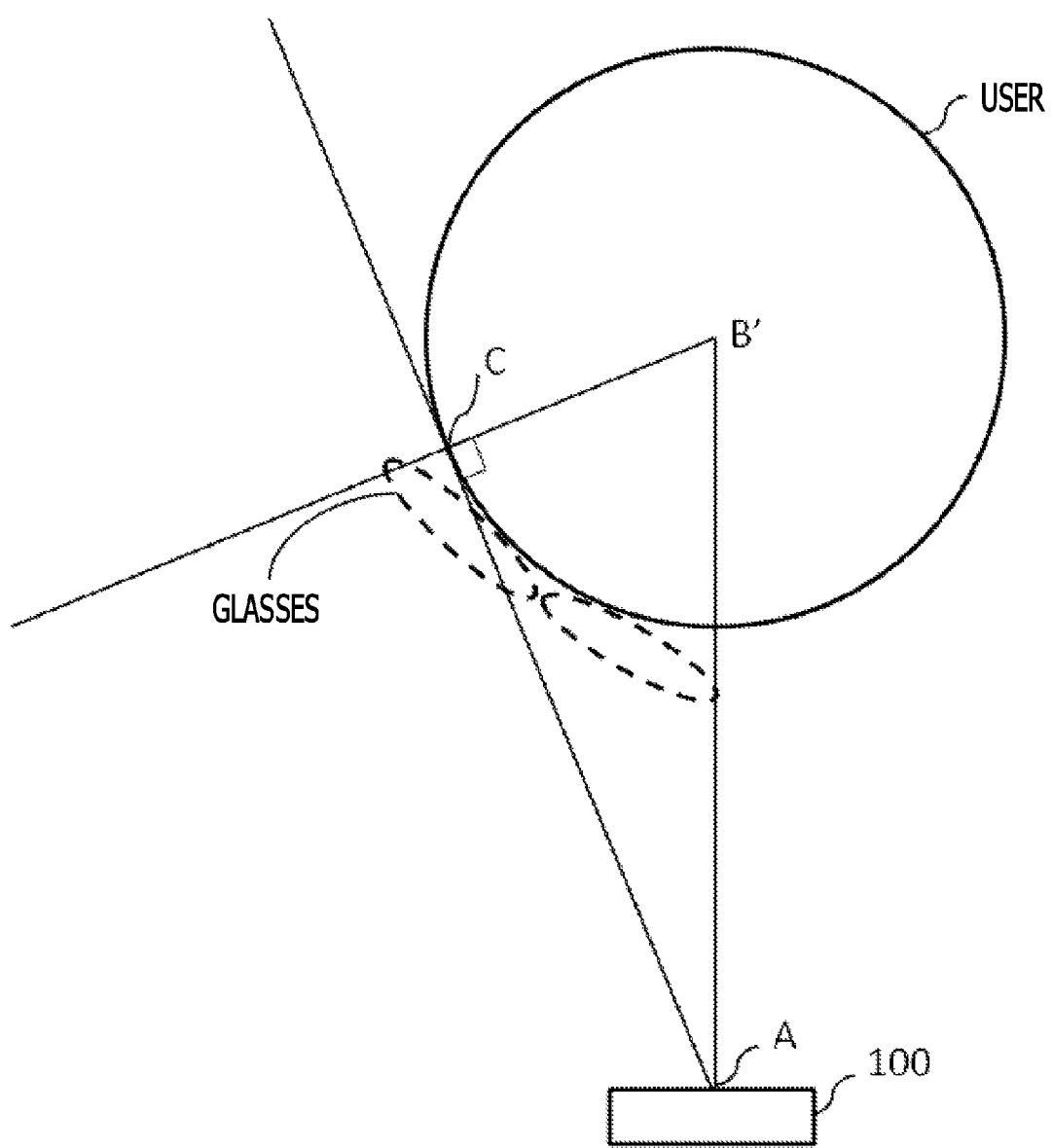
FIG. 5 is a cross-sectional view of a Y-Y' line in FIG. 3.

"B'" in FIG. 5 indicates the center position of the cross section taken along the Y-Y' line of the user's face. "C'" indicates a contour position (first contour position) of the face taken by the camera 5 without the glasses. Positions that correspond to the glasses in the cross section taken along the X-X' line are illustrated by the dotted line.

A distance between the user's face and the camera position A is large, so that it is regarded that a difference between imaging angles from the camera position A of the portable information terminal 100 for the X-X' cross section and the Y-Y' cross section is small enough. Therefore, the camera positions A in FIGS. 4 and 5 are illustrated at the identical position.

Here, when the camera 5 and the face have a certain distance, it is regarded that the angles $\alpha$, $\beta$, and $\gamma$ are small enough. It is assumed that the sizes of the user's face between the X-X' cross section and the Y-Y' cross section are identical. Here, it is assumed that "BF≅B'C'" and "AB≅AB'" are satisfied.

The following formulas 1 to 8 are satisfied.

In $\Delta$DGF, the angle $\beta$ is small enough, so that it is regarded that "∠DGF≅$\pi$/2" is satisfied. Therefore, the following formula 1 is satisfied.

$$\tan \alpha = FG/DG \quad \text{(formula 1)}$$

"∠AGF=∠DGF≅$\pi$/2" is satisfied, so that in $\Delta$AGF, the following formula 2 is satisfied.

$$\tan \beta = FG/AG \quad \text{(formula 2)}$$

The angle $\beta$ is small enough, so that "tan $\beta$≅$\beta$" is satisfied.

$$\tan \alpha \approx \beta \cdot AG/DG \quad \text{(formula 3)}$$

In $\Delta$ABF, the following formula 4 is satisfied.

$$\tan \gamma = BF/AF \quad \text{(formula 4)}$$

In addition, in $\Delta$AGF in which ∠AGF is $\pi$/2, the following formula 5 is satisfied.

$$\tan \beta = FG/AF \quad \text{(formula 5)}$$

When it is regarded that the angles $\beta$ and $\gamma$ are small enough, the relationships of "tan $\beta$≅$\beta$" and "tan $\gamma$≅$\gamma$" are satisfied. Therefore, the following formula 6 is satisfied.

$$\beta = \gamma \cdot FG/BF \quad \text{(formula 6)}$$

The following formula 7 is satisfied by the formulas 3 and 6.

$$\tan \alpha \approx \gamma \cdot FG/BF \cdot AG/DG \quad \text{(formula 7)}$$

In addition, the following formula 8 is satisfied.

$$\sin \gamma = BF/AB = \cos \theta \quad \text{(formula 8)}$$

Therefore, when "AB", "BF≅B'C'", "FG", and "$\theta$" are determined, "$\gamma$" is obtained, and the angle $\alpha$ may be obtained by the formula 7. Therefore, when an image is obtained so that the straight line AB between the center position B of the user's face and the camera position A and the angle $\theta$ are uniquely obtained beforehand, the angle $\alpha$ (that is, refraction index $\alpha$) may be decided by obtaining the straight line BF and the distance FG. At the time of imaging the user's face, the face is imaged so that the line AB and the angle $\theta$ are uniquely obtained beforehand. The detail is described later.

FIG. 6 is a table illustrating the glasses characteristic determination information 16. As illustrated in FIG. 6, to the glasses characteristic determination information 16, refraction indexes $\alpha$\{$\alpha$11, $\alpha$12, $\alpha$21, and $\alpha$22\}, distances BF \{$\alpha$11, $\alpha$12, $\alpha$21, and $\alpha$22\} between the center position B of the user's face and the first contour position, distances FG \{A11, A12, A21, and A22\} between the first contour position and the second contour position, and a glasses characteristic that indicates whether the glasses are farsightedness glasses or nearsightedness glasses are registered.

The refraction index $\alpha$ may be estimated by geometric calculation, but the shape of the head that is not a perfect circle, subtle displacement of the position of the glasses, and the like are considered, and for example, a relationship between "BF", "FG", and the refraction index $\alpha$ in glasses the refraction index of which is known beforehand is registered as the glasses characteristic determination information 16. Here, "BF" and "FG" are obtained from a captured image, and used to determine the corresponding refraction index $\alpha$ and a glasses characteristic.

FIG. 7 is a table illustrating the display screen magnification determination information 15. As illustrated in FIG. 7, to the display screen magnification determination information 15, user identification information that is obtained in facial recognition processing, which is described later, is registered as "aaa", "bbb", "ccc", and "ddd", and in the display screen magnification determination information 15, a glasses characteristic that indicates whether the glasses correspond to farsightedness or nearsightedness, and magnification that indicates a scaling factor of display for a character, image, and the like, as "1.2 times", "1.3 times", "1.4 times", and the like are stored. The magnification is decided by investigating beforehand that which level of magnification is preferred by people who wear glasses depending on a refraction index $\alpha$ of the glasses or the like.

The magnification is decided correspondingly to a refraction index α stored in the glasses characteristic determination information 16.

Figure 8:
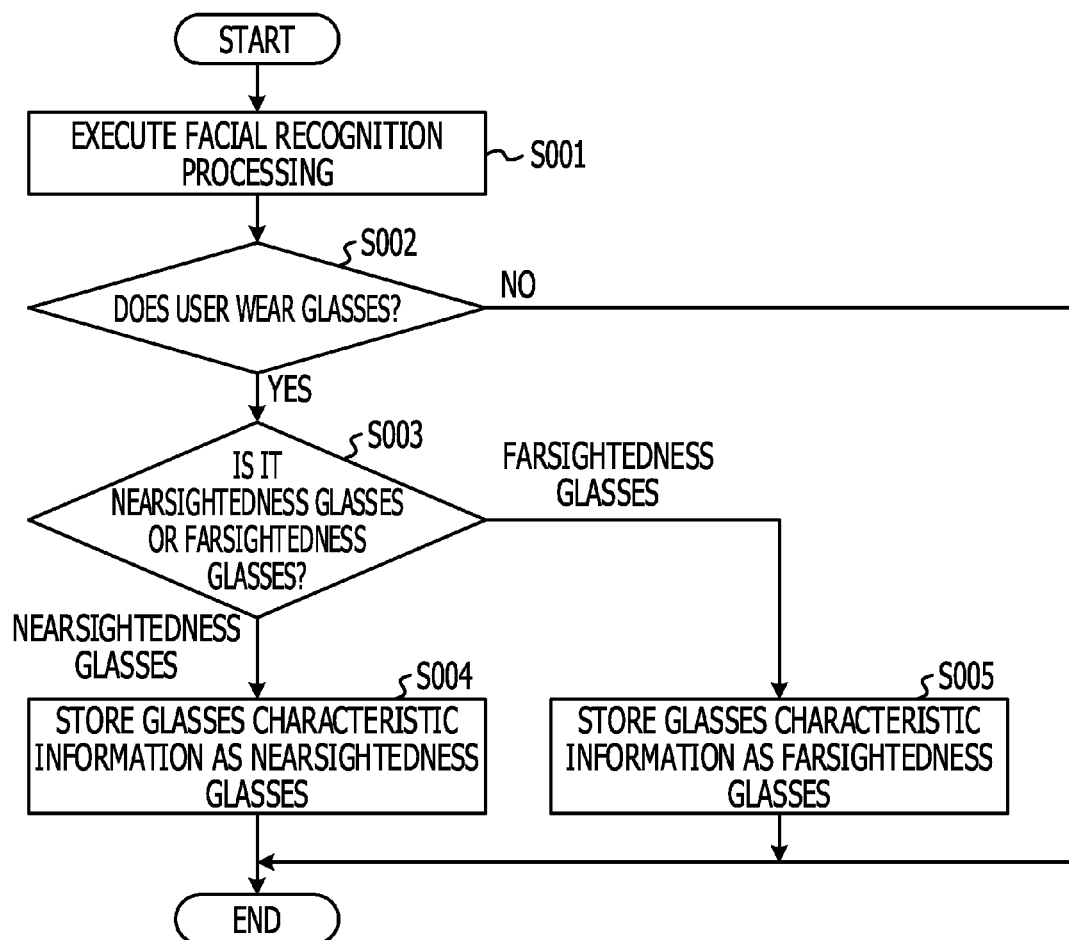
FIG. 8 is a flowchart illustrating glasses characteristic determination processing.

FIG. 8 is a flowchart illustrating the glasses characteristic determination processing according to the first embodiment.

As illustrated in FIG. 8, the image obtaining unit 17 executes the facial recognition processing of determining the user based on an image that includes the user's face obtained with a certain angle θ for the camera 5 (S001). The certain angle θ is an angle between the straight line AB from the center position B of the user's face to the camera position A and the straight line BF from the center position B of the user's face to the second contour position F, which are illustrated in FIG. 4.

After that, the glasses existence determination unit 18 determines whether or not the user wears glasses by determining whether or not there are frames of the glasses around eyes at the time of execution of the facial recognition processing for the user (S002). When the glasses existence determination unit 18 determines that the user wears glasses ("Yes" is determined in S002), the flow proceeds to processing of S003. When the glasses existence determination unit 18 determines that the user does not wear glasses ("No" is determined in S002), the glasses characteristic determination processing ends.

Here, when the glasses existence determination unit 18 determines that the user wears glasses, the glasses characteristic determination unit 14 determines whether the glasses is nearsightedness glasses or farsightedness glasses (S003). When the glasses are determined as nearsightedness glasses, the flow proceeds to processing of S004. When the glasses are determined as farsightedness glasses, the flow proceeds to processing of S005.

The glasses characteristic determination unit 14 determines a characteristic of the glasses of the user as nearsightedness glasses when a contour position (first contour position) of the user's face that appears through the glasses is closer to the center of the user's face than a contour position (second contour position) of the user's face that appears without the glasses in the frames of the glasses, and associates the identification information of the user, which has been determined in the facial recognition processing, with "nearsightedness" that is the characteristic of the glasses to store the associated information in the display screen magnification determination information 15 (S004), and the glasses characteristic determination processing ends.

The glasses characteristic determination unit 14 determines a characteristic of glasses of the user as farsightedness glasses when the contour position (first contour position) of the user's face that appears through the glasses is further from the center of the user's face than the contour position (second contour position) of the user's face that appears without the glasses, in the frames of the glasses, and associates the identification information of the user, which has been determined in the facial recognition processing with "farsightedness" that is the characteristic of the glasses to store the associated information in the display screen magnification determination information 15 (S005), and the glasses characteristic determination processing ends.

In S004 and S005, determination of a refraction index α in image obtaining processing, which is described later, may be performed. The refraction index α is associated with magnification in the display screen magnification determination information 15. The glasses characteristic determination unit 14 obtains a first contour position and a second contour position from an image of the user's face, and calculates the lengths of "BF" and "FG" using a distance from the center position of the user's face to the first contour position and a distance from the first contour position to the second contour position, and determines a refraction index α of the glasses using the glasses characteristic determination information 16. At this time, the determined refraction index α is associated with the corresponding magnification, "BF", and "FG" and registers the associated information in the display screen magnification determination information 15.

(Image Obtaining Processing)

Figure 9:
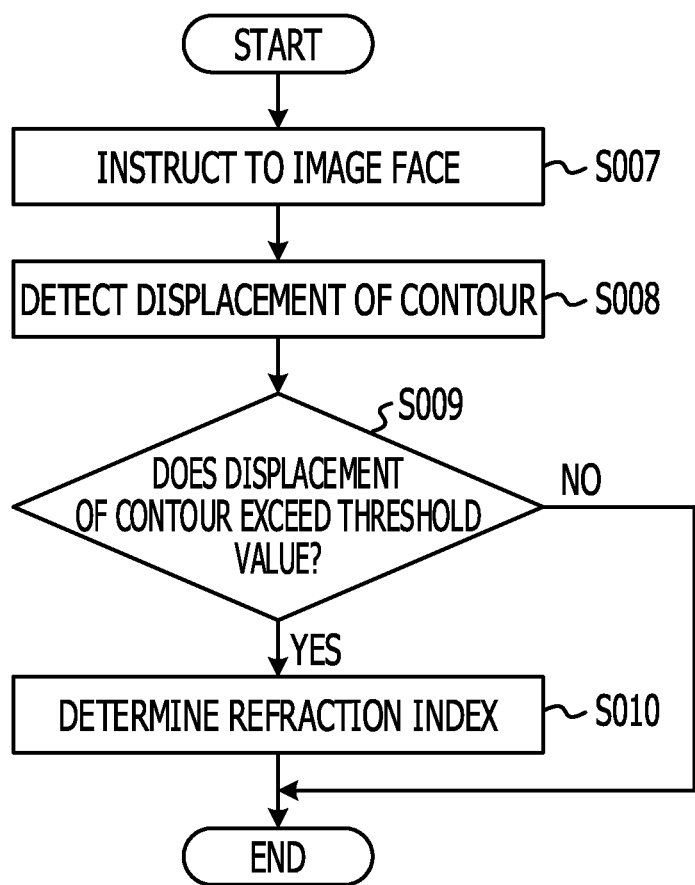
FIG. 9 is a flowchart illustrating image obtaining processing.

FIG. 9 is a flowchart illustrating the image obtaining processing in the first embodiment.

As illustrated in FIG. 9, in a case in which the image obtaining unit 17 obtains an image of the user's face through the camera 5, when the glasses do not exist on the contour of the face because the user's faces the front completely, it is difficult to detect the displacement of the contour, so that an instruction at the time of imaging such as "Please face the side a little" is displayed, and an instruction is executed so that the operator faces the side until the displacement of the contour is confirmed (S007). At that time, the position of the nose, the size of the face, and the like are indicated so that the face angle satisfies the angle θ. In addition, a distance between the camera 5 and the user's face is fit in a certain range by imaging the user's face using the frame in which the distance between the camera 5 and the user's face is fit in a range that is defined beforehand so that the size of the user's face to be imaged and the size of the frame are matched with each other.

The image obtaining unit 17 obtains a first contour position and a second contour position based on the captured image, and calculates the lengths of "BF" and "FG" using a distance from the center position of the user's face to the first contour position and a distance from the first contour position to the second contour position (S008). When the length of "FG" that has been calculated in S008 is smaller than a threshold value defined beforehand, the glasses characteristic determination unit 14 determines that the strength of the glasses is low ("No" is determined in S009), the processing ends. When the length of "FG" that has been calculated in S008 is larger than the threshold value defined beforehand, in the glasses characteristic determination unit 14, "Yes" is determined in S009, and the flow proceeds to processing of S010 (S009). The threshold value used in S009 is set beforehand, for example, based on a refraction index of glasses, which is set beforehand and used to correct the vision so that there is no desire to enlarge the size of a character and an image.

Here, the glasses characteristic determination unit 14 determines a corresponding refraction index α of the glasses from the calculated "BF" and "FG" with reference to the glasses characteristic determination information 16 (S010).

(Glasses Characteristic Determination Using the Glasses Characteristic Determination Information)

Figure 10:
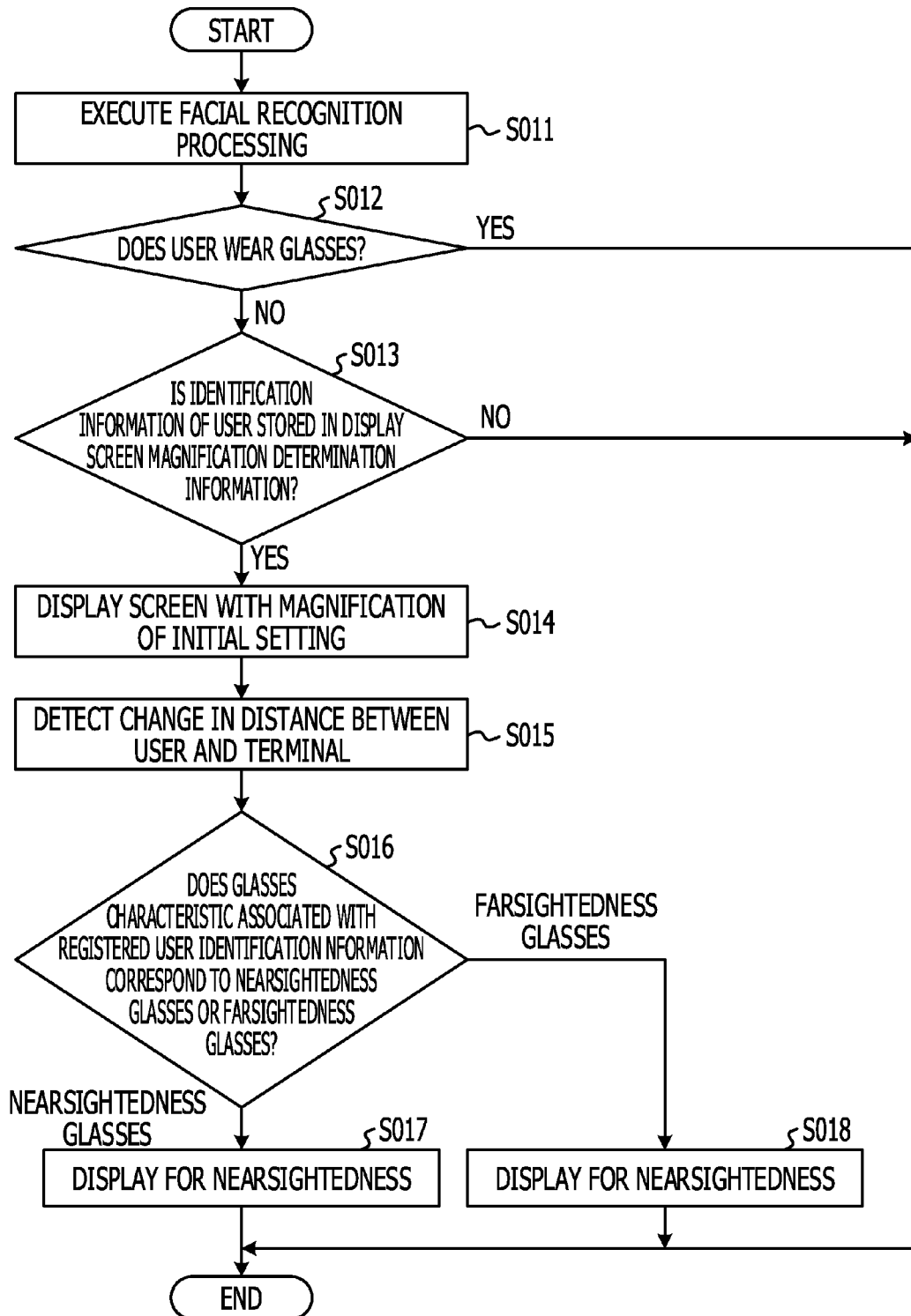
FIG. 10 is a flowchart illustrating magnification determination processing using a glasses characteristic determination result.

FIG. 10 is a flowchart illustrating magnification determination processing using a glasses characteristic determination result.

Figure 11:
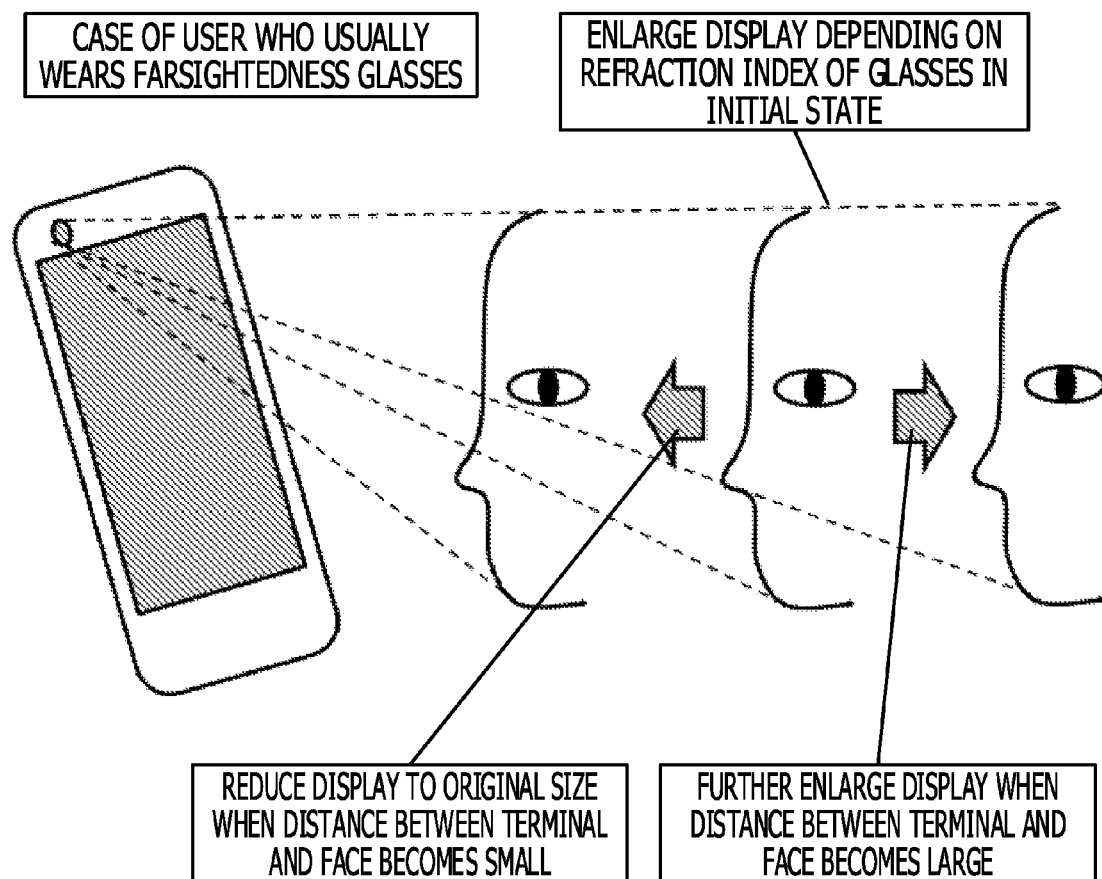
FIG. 11 is a diagram illustrating display that works depending on a distance between the terminal and a user who uses farsightedness glasses.

FIG. 11 is a diagram illustrating display that works depending on a distance between the terminal and the user who uses farsightedness glasses.

Figure 12:
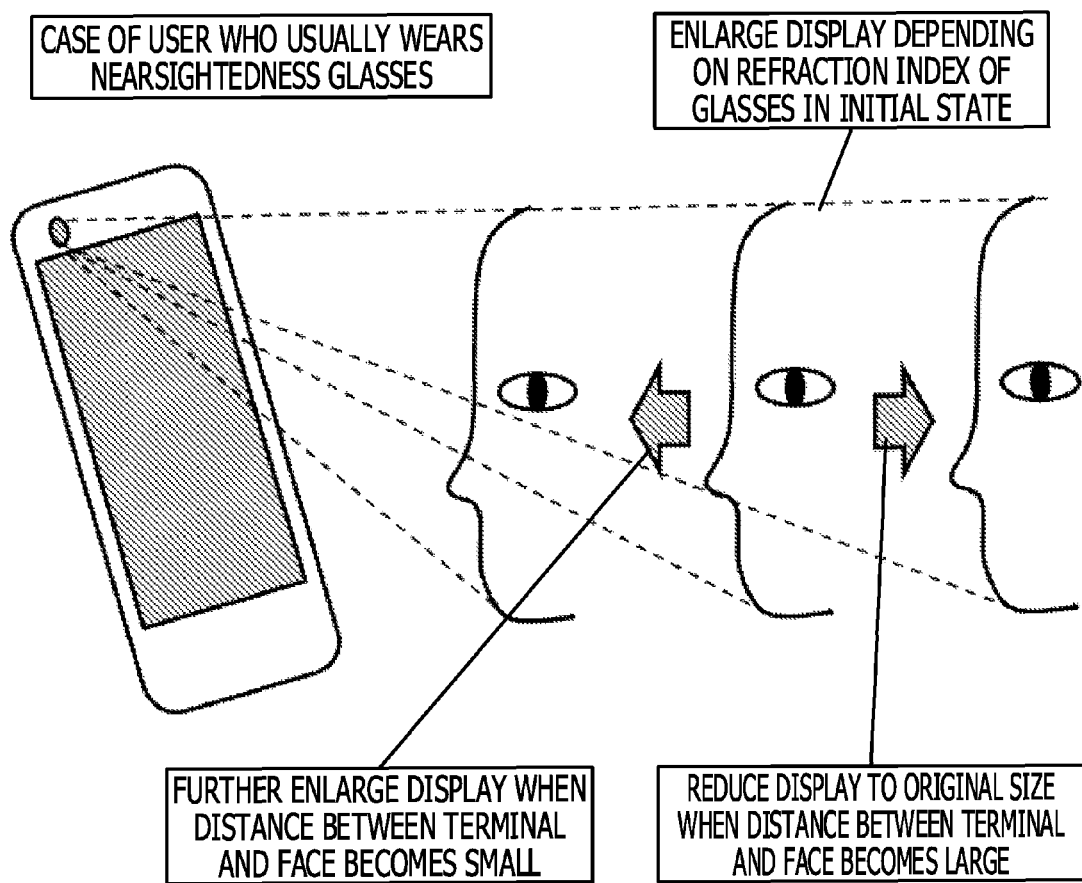
FIG. 12 is a diagram illustrating display that works depending on a distance the terminal and a user who uses nearsightedness glasses.

FIG. 12 is a diagram illustrating display that works depending on a distance between the terminal and the user who uses nearsightedness glasses.

As illustrated in FIG. 10, when the operator does not wear glasses, the sizes of a character and an image to be displayed are corrected by the following method.

The image obtaining unit 17 obtains an image of the user's face through the camera 5, and executes the facial recognition processing of obtaining identification information of the user and recognizing the individual face (S011).

The glasses existence determination unit 18 determines whether or not the user who appears on the image wears glasses (S012). When the glasses existence determination unit 18 determines that the user wears glasses, the processing ends.

Here, when the glasses existence determination unit 18 determines that the user does not wear glasses, the glasses existence determination unit 18 determines whether or not the obtained identification information of the user is stored in the display screen magnification determination information 15 (S013). When the glasses existence determination unit 18 determines that the user identification information is stored in the display screen magnification determination information 15, or when the glasses existence determination unit 18 determines that the user identification information is not stored in the display screen magnification determination information 15 and that the user wears glasses, the processing ends.

When a user operation has been performed with glasses before, that is, when the user identification information is stored in the display screen magnification determination information 15, the state corresponds to a state in which the user whose vision is desired to be usually corrected does not wear glasses, so that the display control unit 13 displays the screen with the magnification that is registered to the display screen magnification determination information 15 (S014). Such magnification is the above-described magnification that corresponds to a refraction index α in the image obtaining processing.

The image obtaining unit 17 notifies the display control unit 13 of change in the size of the user's face (S015) when the change in the size of the user's face is detected through the camera 5.

The display control unit 13 determines whether a glasses characteristic that is associated with the registered user identification information corresponds to nearsightedness glasses or farsightedness glasses (S016).

In a case in which usage of nearsightedness glasses by the user is registered to the display screen magnification determination information 15, the display control unit 13 determines the face comes close to the terminal when the display control unit 13 recognizes that the face appears to become large as illustrated in FIG. 12, and enlarges and displays a character in the display unit because it may be determined that the character on the display in an initial state is still small. Here, in order to detect a distance between the user's face and the screen, further units such as two front cameras or a method of estimating the size of the face on the screen instead of the further units may be employed.

The display control unit 13 determines that the face is further from the terminal when the display control unit 13 recognizes that the face appears to become small, and reduces the size of the display to the size before the magnification (S017) when the face is further from the terminal because it may be determined may determine that the size of the character is large enough to be read or that the character is not desired to be read at that time.

When usage of farsightedness glasses by the user is registered to the display screen magnification determination information 15, as illustrated in FIG. 11, the display control unit 13 determines that the face is further from the terminal when the display control unit 13 recognizes that the face appears to become small, and further enlarges and displays the character on the display unit because it may be determined that the character on the display in the magnified state is still small.

The display control unit 13 determines that the face comes close to the terminal when the display control unit 13 recognizes that the face appears to become large, and reduces the size of the display to the size before the magnification (S018) as the face comes close to the terminal because it may be determined may determine that the size of the character is large enough to be read or that the character is not desired to be read at that time, so that the display control unit 13.

In the first embodiment, as the portable information terminal 100, for example, a smartphone, a tablet PC, or the like is assumed, but the embodiment is not limited to such an example. For example, a desktop PC may be applied as the image processing device according to the embodiment.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An image processing device comprising:
a memory; and
a processor coupled to the memory, configured to:
  acquire, by a camera, an image of a face of a user facing a direction different from a direction of the camera,
  determine whether or not the user is wearing glasses based on the acquired image,
  when determining whether or not the user is wearing glasses, extracting a first contour position indicating a contour position of the face that appears without glasses and extracting a second contour position indicating a contour position of the face that appears through the glasses, from the acquired image,
  determine that the glasses are farsighted glasses when the first contour position is further from a center of the face than the second contour position,
  determine that the glasses are nearsighted glasses when the second contour position is further from the center of the face than the first contour position,
  specify a first straight line from a camera position of the camera to a refraction point on a lens of the glasses from the camera position to the second contour position,
  specify a second straight line from a center position of a cross section of the face to the second contour position,
  specify an intersection of the first straight line and the second straight line,
  calculate a distance between the second contour position and the intersection,
  finalize a process executed by the processor when the calculated distance is smaller than a threshold value defined beforehand, and
  when the calculated distance is greater than the threshold value, determine a refraction index for the glasses based on the threshold value.

2. The image processing device according to claim 1, wherein the processor is configured to decide magnification of information to be displayed based on a type of the glasses.

3. The image processing device according to claim 1, wherein the processor is configured to:
   determine the type of the glasses as the farsightedness glasses when a distance between a center position of the user's face and the first contour position is smaller than a distance between the center position of the user's face and the second contour, and
   determine the type of the glasses as the nearsightedness glasses when the distance between the center position of the user's face and the first contour is larger than the distance between the center position of the user's face and the second contour.

4. The image processing device according to claim 1, wherein,
   the memory stores glasses characteristic determination information in which a distance between the center position of the user's face and the first contour, a distance between the first contour and the second contour, a refraction index, and a type of the glasses that indicates whether the glasses are the nearsightedness glasses or the farsightedness glasses are associated with each other, and
   the processor is configured to determine a refraction index with reference to the glasses characteristic determination information, based on the distance between the center position of the user's face and the first contour and the distance between the first contour and the second contour.

5. The image processing device according to claim 1 further comprising:
   a display device that displays information, wherein the processor is configured to:
   change magnification of the information based on the determined type of the glasses, and
   display the information by the changed magnification used on the display.

6. The image processing device according to claim 5, wherein the processor is configured to:
   increase the magnification, when a distance between the imaging element and the user becomes large and when the determined type of the glasses corresponds to the farsightedness glasses,
   decrease the magnification, when the distance between the imaging element and the user becomes small and when the determined type of the glasses corresponds to the farsightedness glasses,
   increase the magnification, when a distance between the imaging element and the user becomes small and when the determined type of the glasses corresponds to the nearsightedness glasses, and
   decrease the magnification, when a distance between the imaging element and the user becomes large and when the determined type of the glasses corresponds to the nearsightedness glasses.

7. A glasses characteristic determination method executed by a processor included in an image processing device, the glasses characteristic determination method comprising:
   acquiring, by a camera, an image of a face of a user facing a direction different from a direction of the camera;
   determining whether or not the user is wearing glasses based on the acquired image,
   when determining whether or not the user is wearing glasses, extracting a first contour position indicating a contour position of the face that appears without glasses and extracting a second contour position indicating a contour position of the face that appears through the glasses, from the acquired image; and
   determining that the glasses are farsighted glasses when the first contour position is further from a center of the face than the second contour position,
   determining that the glasses are nearsighted glasses when the second contour position is further from the center of the face than the first contour position;
   specify a first straight line from a camera position of the camera to a refraction point on a lens of the glasses from the camera position to the second contour position;
   specify a second straight line from a center position of a cross section of the face to the second contour position;
   specify an intersection of the first straight line and the second straight line;
   calculate a distance between the second contour position and the intersection;
   finalize a process executed by the processor when the calculated distance is larger than a threshold value defined beforehand;
   when the calculated distance is greater than the threshold value, determine a refraction index for the glasses based on the threshold value; and
   when the calculated distance is greater than the threshold value, determine a refraction index for the glasses based on the threshold value.

8. A non-transitory computer-readable recording medium storing a program that, causes a processor included in an image processing device to execute a process, the process comprising:
   acquiring, by a camera, an image of a face of a user facing a direction different from a direction of the camera;
   determining whether or not the user is wearing glasses based on the acquired image,
   when determining whether or not the user is wearing glasses, extracting a first contour position indicating a contour position of the face that appears without glasses and extracting a second contour position indicating a contour position of the face that appears through the glasses, from the acquired image; and
   determining that the glasses are farsighted glasses when the first contour position is further from a center of the face than the second contour position,
   determining that the glasses are nearsighted glasses when the second contour position is further from the center of the face than the first contour position,
   specify a first straight line from a camera position of the camera to a refraction point on a lens of the glasses from the camera position to the second contour position;
   specify a second straight line from a center position of a cross section of the face to the second contour position;
   specify an intersection of the first straight line and the second straight line;
   calculate a distance between the second contour position and the intersection;
   finalize a process executed by the processor when the calculated distance is smaller than a threshold value defined beforehand, and
   when the calculated distance is greater than the threshold value, determine a refraction index for the glasses based on the threshold value.

9. The image processing device according to claim 2, wherein the processor is configured to decide the magnification by referring to magnification determination information in which a user identification, a type of glasses and a magnification of the glasses are associated with each other for each of a plurality of users.

10. The image processing device according to claim 1, wherein the processor is configured to display an instruction to face a side to the user at a timing of imaging so that a displacement of the contour of the face is confirmed.

11. The image processing device according to claim 1, wherein the processor is configured to
    determine whether the user is wearing glasses based on the acquired image by determining whether or not there are frames of the glasses around eyes at a time of execution of a facial recognition process of the user.

* * * * *